(12) United States Patent
Li et al.

(10) Patent No.: US 8,201,152 B2
(45) Date of Patent: Jun. 12, 2012

(54) METHOD AND SYSTEM FOR DEBUGGING A PROGRAM IN A MULTI-THREAD ENVIRONMENT

(75) Inventors: Yan Li, Beijing (CN); Qi Yao, Beijing (CN); Weiying Yu, Beijing (CN); Yong Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 12/110,430

(22) Filed: Apr. 28, 2008

(65) Prior Publication Data

US 2008/0270988 A1 Oct. 30, 2008

(30) Foreign Application Priority Data

Apr. 29, 2007 (CN) .......................... 2007 1 0107751

(51) Int. Cl.
*G06F 9/44* (2006.01)
(52) U.S. Cl. ...................................... 717/129
(58) Field of Classification Search .................... 714/12, 714/34, 35; 717/129, 130
See application file for complete search history.

(56) References Cited

U.S. PATENT DOCUMENTS

| | | | | |
|---|---|---|---|---|
| 4,409,654 A | * | 10/1983 | Wada et al. ................... | 711/213 |
| 5,297,274 A | * | 3/1994 | Jackson .......................... | 703/22 |
| 5,533,192 A | * | 7/1996 | Hawley et al. ................. | 714/28 |
| 5,687,375 A | | 11/1997 | Schwiegelshohn | |
| 6,263,489 B1 | * | 7/2001 | Olsen et al. ................... | 717/129 |
| 6,480,818 B1 | | 11/2002 | Alverson et al. | |
| 6,681,384 B1 | * | 1/2004 | Bates et al. .................... | 717/129 |
| 6,718,484 B1 | * | 4/2004 | Kodera ........................... | 714/35 |
| 6,961,926 B2 | * | 11/2005 | Koyama ......................... | 717/129 |
| 6,978,399 B2 | * | 12/2005 | Bates et al. ..................... | 714/34 |
| 7,020,871 B2 | * | 3/2006 | Bernstein et al. ............. | 717/129 |
| 7,168,067 B2 | | 1/2007 | Betker et al. | |
| 7,620,802 B2 | * | 11/2009 | Takuma et al. ................ | 712/227 |
| 2005/0034024 A1 | * | 2/2005 | Alverson et al. ................ | 714/38 |
| 2008/0127119 A1 | * | 5/2008 | Kasman ......................... | 717/130 |

OTHER PUBLICATIONS

Debugging tools and techniques for Linux on Power, Sze et al., Aug. 4, 2005.*
Debugging multithread application, Zikmund, 10, Mar. 2004.*
Ramsey, Norman "Correctness of Trap-Based Breakpoint Implementations" Bell Communications Research, ACM 0-89791-636, 1994.
"Debugging Multithread Application", www.netbeans.org/issues/show_bug.cgi?id=40901, NetBeans, Issue 40901, Mar. 10, 2004.

* cited by examiner

*Primary Examiner* — Wei Zhen
*Assistant Examiner* — Daxin Wu
(74) *Attorney, Agent, or Firm* — Grasso PLLC; Fred Grasso

(57) ABSTRACT

A method and system for debugging a program in multithread environment which interrupts the running of a debuggee program begins by replacing the instruction at the position at which a breakpoint for debugging is desired to be set with a breakpoint instruction. When the breakpoint instruction is replaced back with the instruction at the position at which the breakpoint for debugging is set, an instruction is set in front of the breakpoint for debugging as a fence breakpoint; and when the instruction at the position at which the breakpoint for debugging is set, is replaced again with the breakpoint instruction. On completion, the fence breakpoint is replaced with the original instruction of the debuggee program at that position.

18 Claims, 9 Drawing Sheets

METHOD AND SYSTEM FOR DEBUGGING A PROGRAM IN A MULTI-THREAD ENVIRONMENT

FIELD OF THE INVENTION

The present invention relates to the data processing field, particularly to a method and system for debugging a program in a multithread environment.

BACKGROUND

A computer system (100, FIG. 1) as well as a computer-based apparatus (e.g. an industrial automation system) usually comprises one or more central processor units, a random access memory for storing data or control instructions, an I/O interface for interaction with user such as data or instruction inputs, and other related components. Such a computer system or a computer-based apparatus needs the support of operating system and application software in order to work. Typically, software products need to be tested and debugged before being brought into use so as to ensure the correctness of running results and compliance with design requirements. Therefore, debugging tools are needed.

A debugger (debugging program 110) is a software product used to start another software product (referred to as a "debuggee program" 120) and monitor the execution of the debuggee program (see FIG. 1). The debugger has a function called "single stepping" which can control the debuggee program to execute step by step (as differentiated from continuous execution). In addition, the debugger may also control the debuggee program to run continuously until it reaches a certain position predefined by user. This kind of control is implemented by setting breakpoints for debugging in the debuggee program. Regardless of breakpoint mode or single stepping mode, at each breakpoint for debugging or after each single step, the debugger will take over the control to perform debugging work.

Debugging work typically includes, but is not limited to:
1. checking values of variables, such as the contents of particular CPU registers in order to help the user analyze the reason of errors in the debuggee program;
2. suspending the execution of a certain part or whole of the program, and then passing control to a programmer through an interactive user interface;
3. running a user pre-defined routine; and
4. dumping the status of the debuggee program (generating a snapshot), that is, saving its running status at a certain moment into a certain external storage for later analysis.

Thus, the basic functionality of breakpoint mechanisms in debuggers (or other similar instrumentation tools) is to cause the generation of notifications or interruptions at desired points in a stream of executed instructions, where the points of interception are specified dynamically at run-time rather than pre-programmed at developing-time. The method by which the debugger deals with such breakpoints is called a "breakpoint handling mechanism".

The breakpoint handling mechanism of the debugger will be described in detail below.

The most widely used breakpoint handling mechanism is the software breakpoint handling mechanism. This kind of mechanism is implemented completely by software and does not depend on any specific hardware mechanism. It has a long history, and dates back to the infancy of modern computers. In this kind of mechanism, the debugger replaces an instruction with a breakpoint instruction in the instruction stream of the debuggee program where the breakpoint for debugging is desired. When the program runs to this breakpoint instruction, it is "trapped" into the operating system 105 (that is, the operating system will assume control), and the operating system proceeds to pass the control to the debugger to perform specific debugging work. After the debugger completes the debugging work, the normal execution of the debuggee program needs to be restored. At this time, the debugger will restore the original instruction that has been replaced with the breakpoint instruction, and execute it (at this time, the breakpoint instruction is overwritten and no longer exists). Since the breakpoint instruction no longer exists at this time, the debugger needs to restore the breakpoint instruction before passing the control to the debuggee program, so that the breakpoint mechanism will be triggered correctly when the debuggee program runs to this position next time.

It should be noted that we use "replace" or "write" instead of "insert" for a breakpoint instruction in the above description, because binary instructions are highly dependent upon their resident locations in the computer. If a new instruction is "inserted" into a fragment of instruction stream, then all of the instructions following it would fail. So the only practical way for modifying a binary instruction stream is to replace part of the instructions therein.

FIG. 2 shows a conventional software breakpoint handling mechanism under a single-thread environment. The upper part of the figure illustrates the status of the instruction stream of the debuggee program at different times, from left to right illustrating the varying process of the instruction stream in time sequence.

Specifically, as shown in FIG. 2, at time t1, before being debugged, the instruction stream of the debuggee program is unmodified by the debugger (step 201). Next, at time t2, the user sets a breakpoint for debugging at for example the position of instruction "INSTR.3" of the debuggee program. In this case, the debugger replaces the instruction "INSTR.3" with a trap instruction in the instruction stream of the debuggee program (step 202). Further, after modifying the instruction stream as mentioned above, at step 203, the debugger starts the debuggee program.

After the debuggee program is started, as soon as it runs to the trap instruction, the operating system takes over control, and passes control to the debugger, thus entering the breakpoint handling mechanism of the debugger (step 204).

Specifically, in the breakpoint handling mechanism, first, at step 205, the current running status of the debuggee program is saved. At this step, the motive for saving the current running status is to enable the debugger to restore the previous status of the debuggee program before returning control to it when the debugger finishes the debugging operations; otherwise, the running environment of the debuggee program would be corrupted.

Next, at step 206, the debugging work is performed. As mentioned above, the debugging work may include checking values of variables; suspending the running of a certain part of or the whole program, or obtaining instructions from a programmer 130 through an interactive UI and executing them; running a user pre-defined routine; or generating a snapshot of the running status of the debuggee program.

At step 207, the original instruction of the debuggee program at the breakpoint for debugging is restored. That is, the trap instruction is replaced with the instruction "INSTR.3". At this moment, the instruction sequence of the debuggee program is as shown at time t3 in FIG. 2. Specifically, once the debugging work is finished, the running of the debuggee program must be restored. However, the debuggee program cannot simply continue to run at this moment, since the next instruction following the trap instruction is "INSTR.4", and the instruction "INSTR.3" has not been executed by now. As described above, binary computer instructions are highly dependent upon their resident locations, so the instruction "INSTR.3" cannot be executed simply from another location. Therefore, the debugger must restore the instruction "INSTR3", that is, write the instruction back to its original position, so as to ensure that the debuggee program continues to run correctly.

Next, at step 208, the single stepping mechanism is enabled. Specifically, the reason for enabling the single stepping mechanism at this step is that, after the instruction "INSTR.3" is restored, the debugger cannot simply make the debuggee program continue to run. This is because after the instruction "INSTR.3" is restored, no breakpoint instruction exists in the instruction stream of the debuggee program Thus, when the debuggee program runs to the position of the instruction "INSTR.3" next time, no breakpoint for debugging will be met as before. Therefore, after the instruction "INSTR.3" is executed, the debugger must set the breakpoint for debugging back as soon as possible, that is, replace the instruction "INSTR.3" with the trap instruction again. Thus the debuggee program will execute only one instruction, i.e. the instruction "INSTR.3", and then passes the control to the debugger. This is the single stepping mechanism mentioned above.

In addition, some architectures support "hardware single stepping", and some not. If the system supports "hardware single stepping", then the debugger enables the "hardware single step" mechanism, otherwise the debugger enables "software single step" mechanism provided by the operating system to trigger a "trapping" event after the debuggee program executes every single instruction.

At step 209, the debugger restores the status before the interruption of the debuggee program based on the running status saved at step 205, and passes the control to the debuggee program to continue its running.

As indicated at step 210, at time t3, the instruction "INSTR.3" is executed. Further, as indicated at step 211, since the single stepping mechanism is used, after execution of the instruction "INSTR.3" and before execution of the instruction "INSTR.4", at time t4, another "trapping" event is triggered automatically. Thus, the debugger obtains the control again to enter into the breakpoint handling mechanism. At step 212, the debugger disables the single stepping mechanism so as to avoid unnecessary "trapping" event.

At step 213, the current status of the debuggee program is saved.

At step 214, the instruction "INSTR.3" is replaced with a trap instruction and the instruction stream at this moment is as shown at time t5 of FIG. 2. At step 215, the debugger restores the status of the debuggee program saved at step 213. At step 216, the debugger returns control to the debuggee program to continue its running. That is, as indicated at time t5 of FIG. 2, the debuggee program continues to execute other instructions beginning from the instruction "INSTR.4".

Attention now turns to breakpoint handling solutions for multithreaded debuggee programs, as the above conventional software breakpoint handling mechanism cannot be used for a multithreaded debuggee program. This is because that during some points of this kind of mechanisms, there is no breakpoint instruction in the instruction stream, (e.g. time t3 and time t4 in FIG. 2). This time window is called the "dangerous window" (see, for example, Norman Ramsey, "Correctness of Trap-based Breakpoint Implementations"; Proceedings of the 21st ACM Symposium on the Principles of Programming Languages, January 1994). This window is long enough for a computer system whose process speed has been increased rapidly to make other threads running to this position miss the breakpoint for debugging. This is particularly serious on a multi-processor machine.

There are the following solutions at present for this kind of multithreaded debuggee programs.

The first method is to suspend other running threads before the debugger handles a breakpoint for debugging and resume them at full speed when the debugger finishes all breakpoint handling operations.

FIG. 3 is a flowchart illustrating the breakpoint handling method. As shown in FIG. 3, when a thread runs to a breakpoint for debugging or a "trap" instruction, the debugger first suspends all other threads before any further breakpoint processing operation (step 318). Further, after setting a breakpoint instruction again and before restoring the normal running of the debuggee program, the debugger resumes all the suspended threads (step 319). In addition, all the other steps 301-316 are identical to steps 201-216 in FIG. 2.

Although this method can implement the breakpoint processing of a multithread debuggee program, the overhead for suspending and resuming the other threads is tremendous, and increases as the increment of the number of threads and CPUs.

Method 2: Move the Original Instruction to a New Location:

In some situations, such as debugging the OS kernel or firmware, suspending the thread is usually impossible, or would be too slow to be tolerable. Both djprobe project homepage "http://sourceforge.net/project/showfiles.php?group id=41854" and kprobe project homepage "http://sourceware.org/systemtap/kprobes/" provide a debugging method for multithreaded debuggee which eliminates the "dangerous window" and requires no suspending of other threads. Specifically, in the second method, the original instruction of the debuggee program at the breakpoint for debugging is moved to another location for execution, and its meaning is kept unchanged.

FIG. 4 is a flowchart illustrating this breakpoint handling method. As shown in FIG. 4, after the debugger finishes debugging, the instruction "INSTR.3" is executed at a new location (step 420). The other steps 401-406 and 409 are identical to the steps 201-206 and 209 in FIG. 2.

However, as mentioned above, the meaning of an instruction is closely related to its location, so moving an instruction to a new location involves parsing of its meaning and reimplementing the instruction at the new location with exactly the same logical meaning of the original instruction. This parsing process can be very sophisticated. Further, being highly dependent upon specific hardware architectures, different parsers must be designed for respective all supported architectures.

Method 3: Hardware Breakpoint:

The third method is implemented by using the hardware breakpoint mechanism. Some processors include breakpoint registers, in which an address can be stored. An interrupt is triggered when the processor executes or accesses this address. The usage of the hardware breakpoint mechanism eliminates the need to modify the instruction sequence of the debuggee program.

However, the number of such breakpoint registers is quite limited, and may not be sufficient to meet the requirement in a real implementation. Moreover, commercial hardware architectures often do not support the hardware breakpoint mechanism at all. Therefore, the hardware breakpoint mechanism is usually used, when it is used at all, as a supplement to the software breakpoint mechanism.

SUMMARY

The present invention provides a method and system for debugging a program in multithread environment. A fence breakpoint may be set in front of a breakpoint for debugging to ensure that other threads do not miss the breakpoint for debugging, without requiring that these other threads be suspended.

According to an aspect of the present invention, there is provided a method for debugging a program in multithread environment. The method may interrupt the running of the debuggee program by replacing the instruction at the position at which a breakpoint for debugging is desired to set with a breakpoint instruction. The method is characterized by: when the breakpoint instruction is replaced with the original instruction at the position at which the breakpoint for debugging is set, setting an instruction in front of the breakpoint for debugging as a fence breakpoint; and when the instruction at the position at which the breakpoint for debugging is set is replaced again with the breakpoint instruction, replacing the fence breakpoint with the original instruction of the debuggee program at that position.

According to another aspect of the present invention, there is provided a system for debugging a program in multithread environment. The system may interrupt the running of the debuggee program by replacing the instruction at the position at which a breakpoint for debugging is desired to set with a breakpoint instruction. The system may include: a fence breakpoint setting unit for, when the breakpoint instruction is replaced with the original instruction at the position at which the breakpoint for debugging is set, setting an instruction in front of the breakpoint for debugging as a fence breakpoint; and a fence breakpoint canceling unit for, when the instruction at the position, at which the breakpoint for debugging is set, is replaced again with the breakpoint instruction, replacing the fence breakpoint with the original instruction of the debuggee program at that position.

DETAILED DESCRIPTION

In the present invention, during the breakpoint operation for a thread of the debuggee program, a "fence breakpoint" invisible to the user is set in front of the breakpoint for debugging, so as to ensure that at least one breakpoint is in the instruction stream of the debuggee program during the restoration of the original instruction and the single stepping of the original instruction after the debugging operation is finished.

That is to say, in the present invention, during the breakpoint operation for a certain thread running to the breakpoint for debugging, a fence breakpoint will be inserted in front of the breakpoint for debugging visible to the user. Thus other threads will either hit the fence breakpoint, or hit the breakpoint for debugging and stop without missing the breakpoint for debugging set by the user.

First, a method for debugging a program in multithread environment of the present invention will be described.

Figure 1:
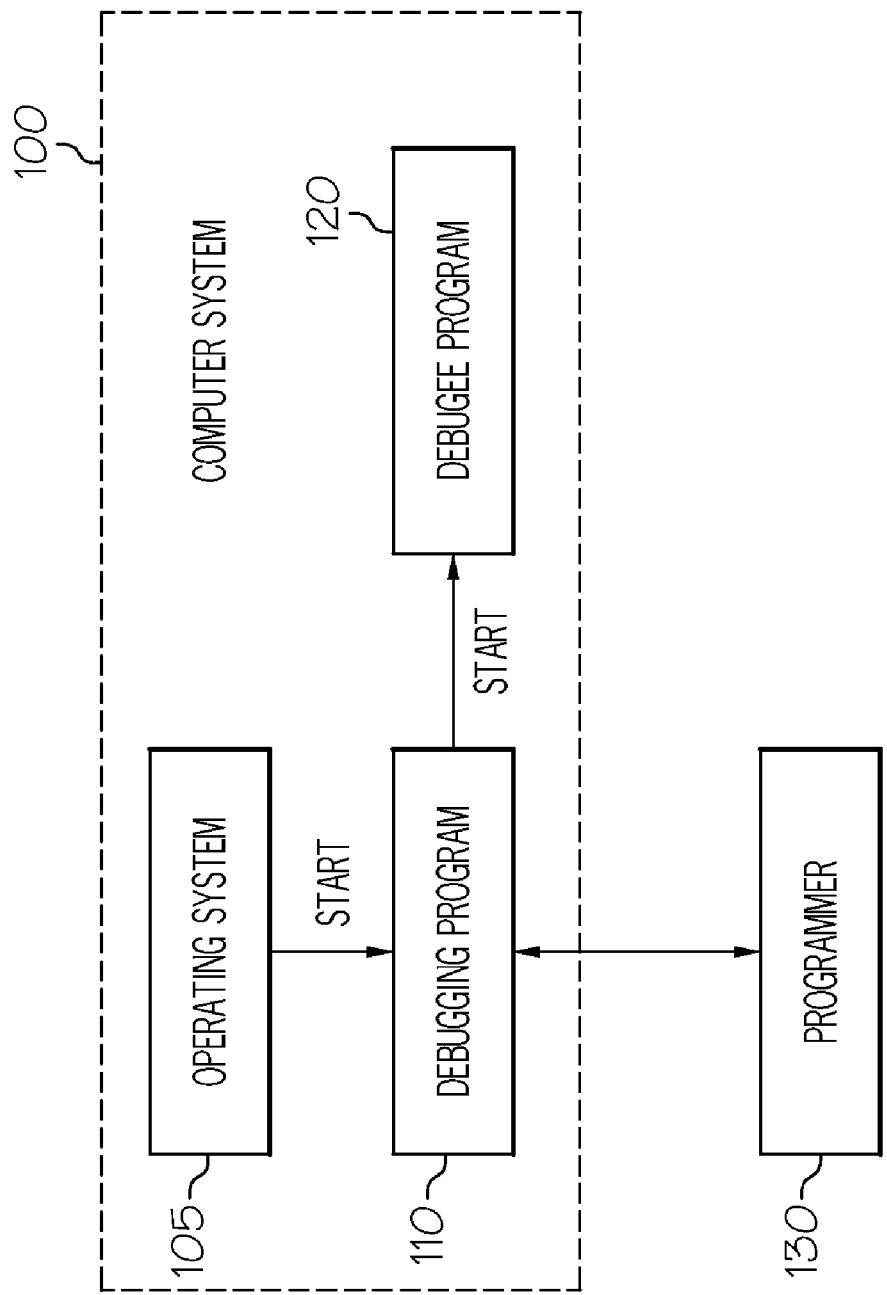
FIG. 1 is a schematic diagram illustrating the relation between the debugger and the debuggee program.
Figure 2:
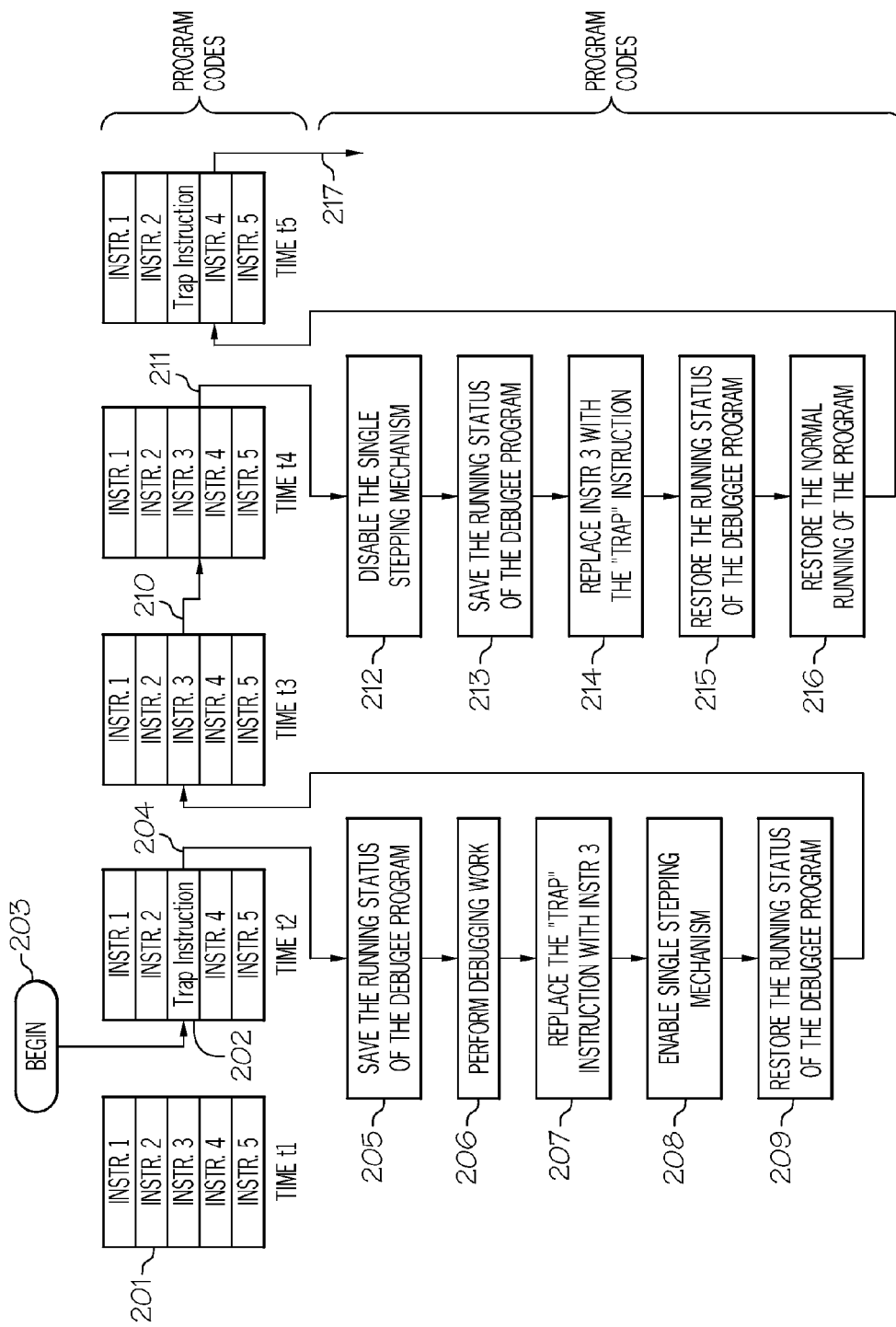
FIG. 2 is a schematic flowchart illustrating a conventional software breakpoint handling mechanism in single thread environment.
Figure 3:
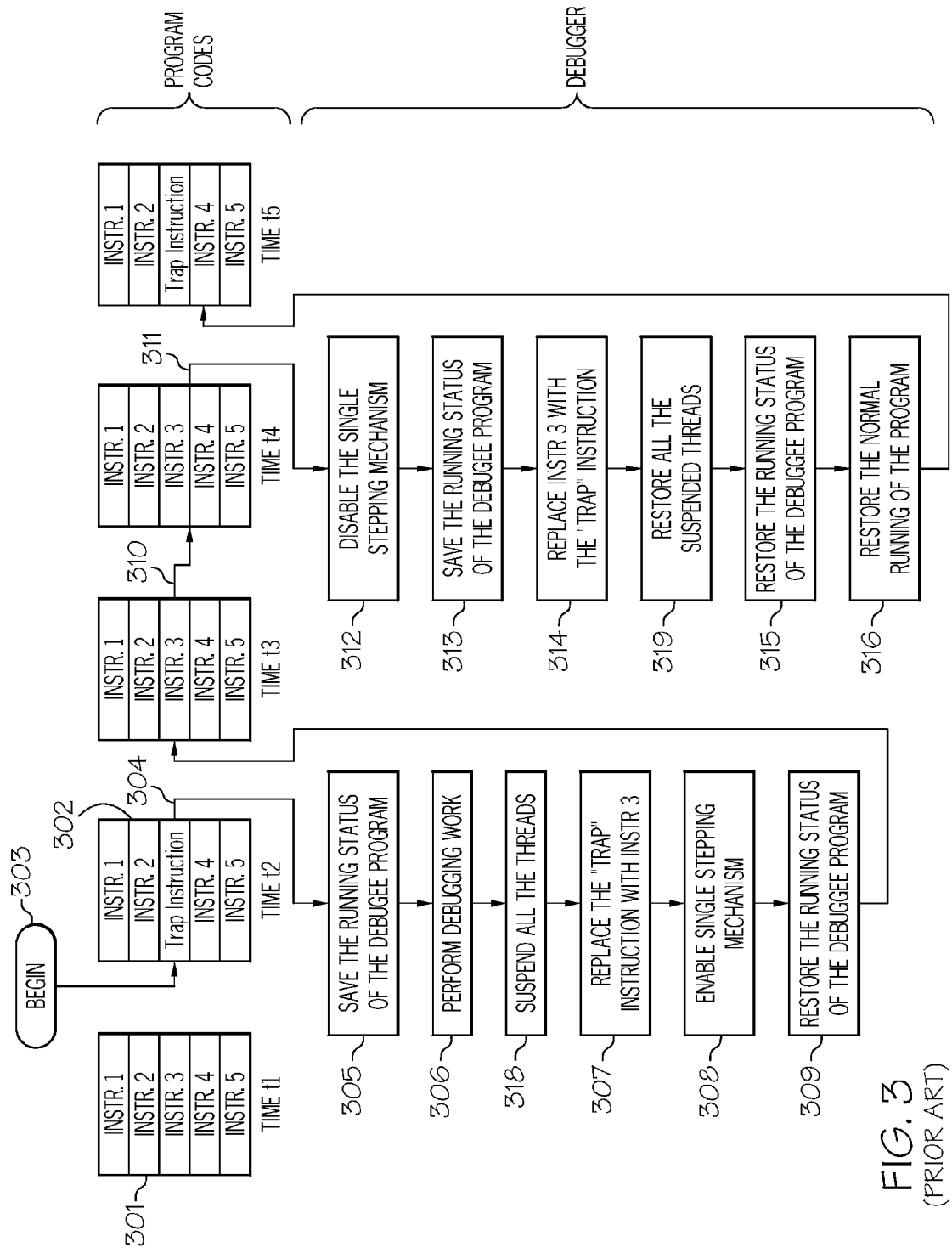
FIG. 3 is a schematic flowchart illustrating a conventional breakpoint handling mechanism in multithread environment.
Figure 4:
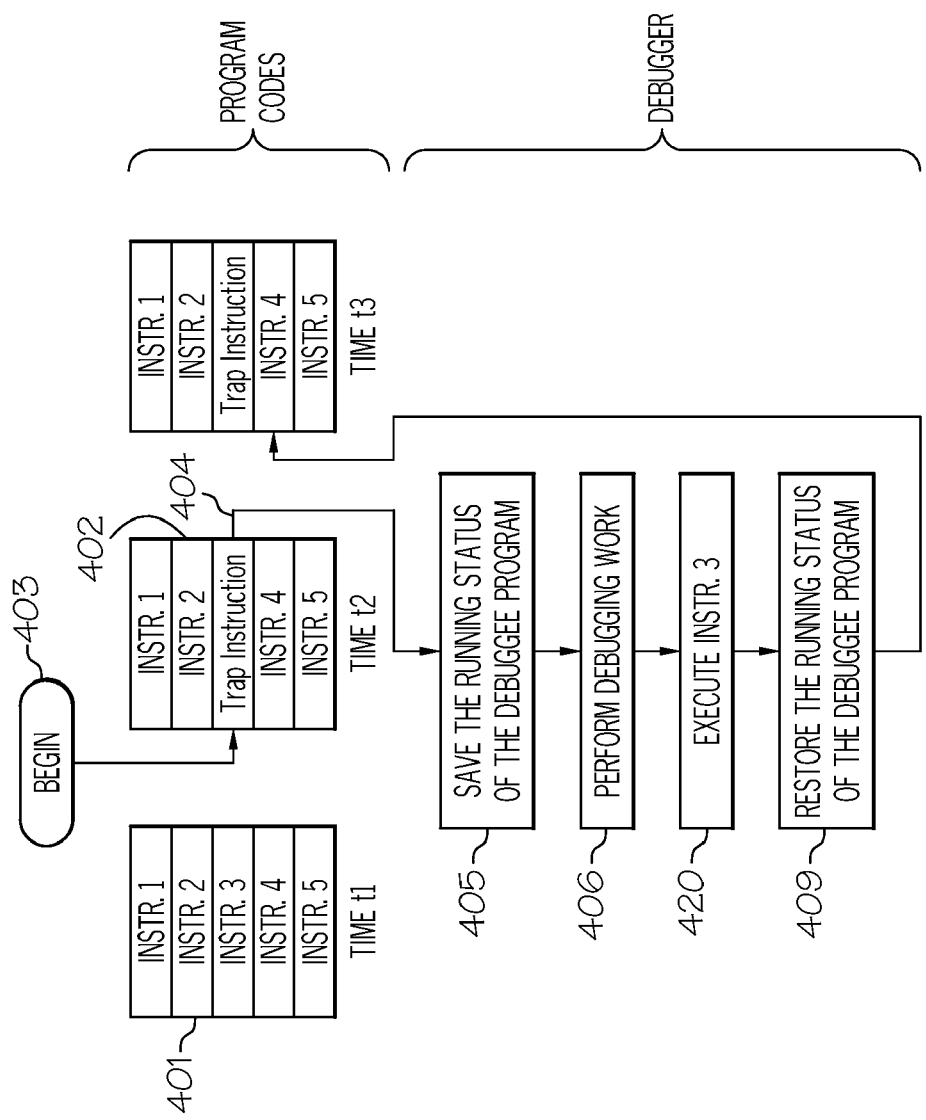
FIG. 4 is a schematic flowchart illustrating another conventional breakpoint handling mechanism in multithread environment.
Figure 5:
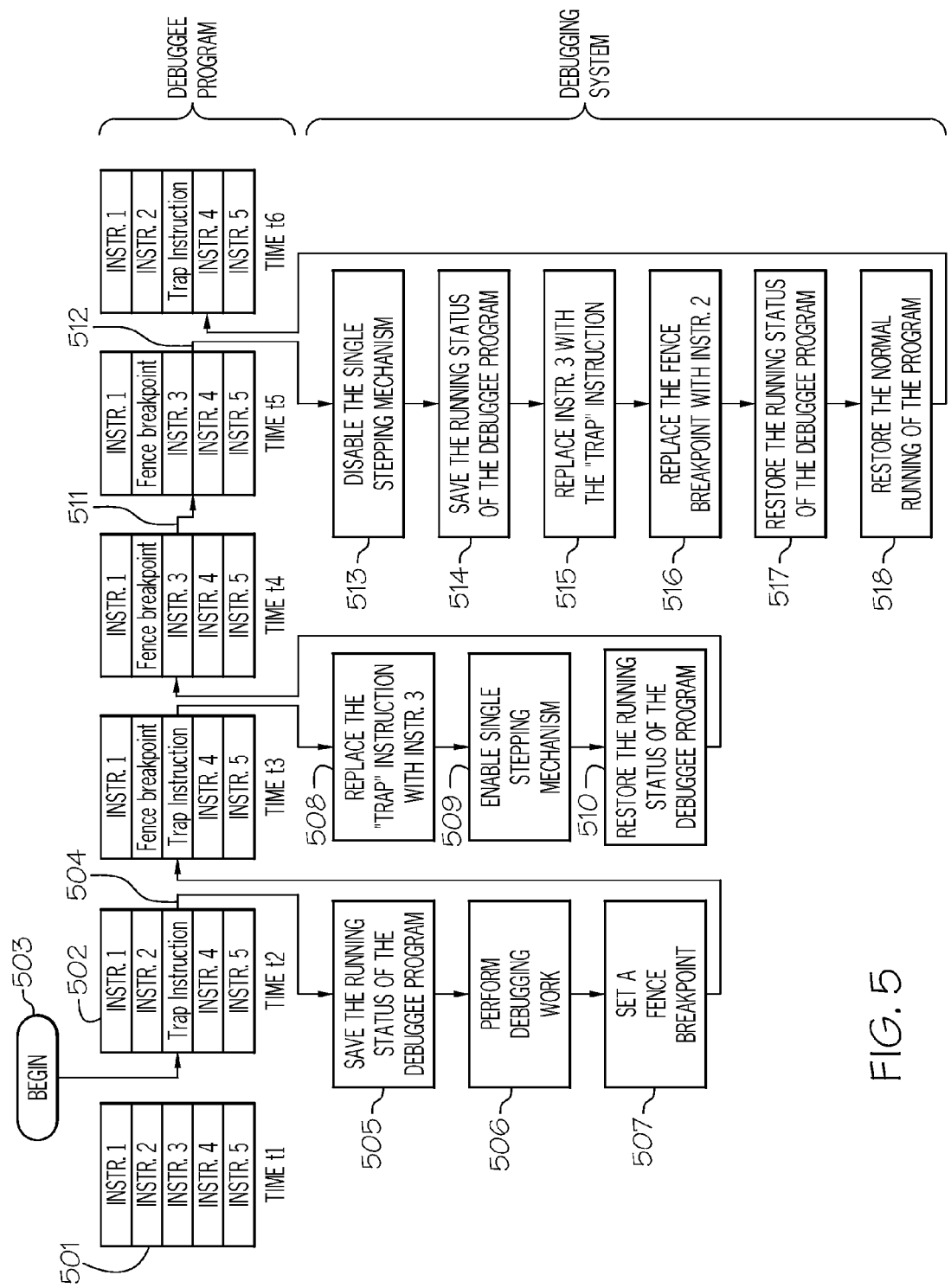
FIG. 5 is a schematic flowchart illustrating a method for debugging a program in multithread environment according to an embodiment of the present invention.

FIG. 5 is a schematic flowchart illustrating a method for debugging a program in multithread environment according to an embodiment of the present invention. Therein the upper part of the figure illustrates the status of the instruction stream of the debuggee program at different times, from left to right illustrating the varying process of the instruction stream in time sequence.

Specifically, as shown in FIG. 5, at time t1, before being debugged, the instruction stream of the debuggee program is not modified by the debugger (step 501). It is noted that the debuggee program may be a binary instruction stream compiled by a compiling tool.

Next, at time t2, the user sets a breakpoint for debugging at the position of instruction "INSTR.3" of the debuggee program through a UI for example. In this case, the debugging system replaces the instruction "INSTR.3" with a breakpoint instruction in the instruction stream of the debuggee program (step 502). Herein, the breakpoint instruction is a trap instruction. That is, in the present embodiment, the breakpoint instruction is used to interrupt the running of the debuggee program so that the debuggee program enters into the debugging stage based on the current status.

After modifying the instruction stream of the debuggee program as mentioned above, the debugging system starts the debuggee program according to the instruction of the user (step 503). Further, after the debuggee program is started, when a certain thread thereof runs to the trap instruction, the operating system takes over the control, passes the control to the debugging system, so as to enter the breakpoint handling stage as shown in steps 505-510 of FIG. 5 (step 504).

Specifically, in this breakpoint handling stage, first at step 505, the current running status of the thread of the debuggee program is saved. At this step, the purpose for saving the current running status of the thread is to enable restoration of the status before the interruption of the thread before the breakpoint handling stage is finished and the control is returned to the thread, otherwise the running environment of the thread will be corrupted, and the following operation may cause errors, or the thread may be unable to run correctly again.

Next, at step 506, debugging work are performed. Specifically, at this step, the debugging work is performed on the debuggee program according to the current running status of the thread such as the current value of variables in registers. As mentioned above, the debugging work may include:

checking values of variables; suspending the running of a certain part of or the whole program, or obtaining the instructions of the programmer through an interactive UI and executing them; running a user pre-defined routine; or generating a snapshot of the running status of the debuggee program.

Next, at step 507, one or more fence breakpoints are set in front of the breakpoint for debugging mentioned above. Specifically, in this embodiment, one fence breakpoint is set at the position one-instruction-previous to the breakpoint for debugging, i.e. the trap instruction, that is, the previous instruction is replaced with the fence breakpoint instruction. In this embodiment, the fence breakpoint instruction is a trap instruction. At this time, the instruction stream of the debuggee program is as shown at time t3 in FIG. 5.

The original instruction replaced with the breakpoint instruction at the breakpoint for debugging should be placed back in order to single-step it after the debugging work is finished, which causes no breakpoint for debugging to exist for a window in the instruction stream of the debuggee program. An object of setting the fence breakpoint at this step is to ensure that other threads of the debuggee program will not miss the breakpoint for debugging within this window by using the fence breakpoint. In addition, details of the process for setting fence breakpoints at this step will be described in detail later in conjunction with FIGS. 6-9.

Next, at step 508, the breakpoint for debugging is cancelled, and the original instruction of the debuggee program at the position of the breakpoint for debugging is restored. That is, the trap instruction at the position is replaced with instruction "INSTR.3". At this time, the instruction stream of the debuggee program is as shown at time t4 in FIG. 5.

Once the debugging work is finished, the running of the interrupted thread must be restored. However, the debuggee program cannot simply continue to run at this time, since the next instruction following the trap instruction is "INSTR.4", and the instruction "INSTR.3" has not been executed yet. As described above, binary computer instructions are highly dependent upon their resident locations, so the instruction "INSTR.3" can't be executed simply from another location. Therefore, the instruction "INSTR3" must be restored. That is, the instruction must be written back to its original position, so as to ensure that the thread continues to run correctly.

At step 509, the single stepping mechanism is enabled. One reason for enabling the single stepping mechanism at this step is that, after the instruction "INSTR.3" is restored, the interrupted thread of the debuggee program cannot simply continue to run. This is because after the instruction "INSTR.3" is restored, no breakpoint instruction exists at the desired location in the instruction stream of the debuggee program. Thus, the next time the debuggee program runs to the position of the instruction "INSTR.3", no breakpoint for debugging will be met as before. Therefore, after the instruction "INSTR.3" is executed, the breakpoint for debugging should be set as soon as possible. That is, the instruction "INSTR.3" should be replaced with the trap instruction again. Thus, it is preferred that the thread of the debuggee program execute only one instruction, i.e. the instruction "INSTR.3", then pass control to the debugging system. This is the single stepping mechanism mentioned above.

Some architectures support "hardware single stepping", and some architectures do not. If the system supports "hardware single stepping", then the "hardware single stepping" mechanism is enabled at this step, otherwise the "software single stepping" mechanism provided by the operating system is enabled to trigger a "trapping" event after the thread of the debuggee program executes one instruction.

At step 510, the status previous to interruption of the thread of the debuggee program is restored based on the running status saved at step 505, and control is passed to the thread to continue its running.

Next, as indicated at step 511, at time t4, the instruction "INSTR.3" is executed. As indicated at step 512, since the single stepping mechanism is used, after the execution of the instruction "INSTR.3" and before the execution of the instruction "INSTR.4", at time t5, another "trapping" event is triggered automatically. Thus, the debugging system obtains control again to enter into the breakpoint handling stage as shown at steps 513-518 of FIG. 5.

In this breakpoint handling stage, first at step 513, the single stepping mechanism is disabled so as to avoid unnecessary "trapping" events.

Next, at step 514, the current running status of the thread of the debuggee program is saved. At step 515, a breakpoint for debugging is set again, and the instruction "INSTR.3" is replaced with a trap instruction. That is, at this step, a breakpoint for debugging is set again at the position of the instruction "INSTR.3", so that next time, the debuggee program running to this position, will be interrupted to enter the debugging phase. At step 516, the fence breakpoint is cancelled. That is, the fence breakpoint instruction is replaced with instruction "INSTR.2". After resetting the breakpoint for debugging at step 515, the fence breakpoint is no longer needed and should no longer exist in the instruction stream of the debuggee program. So at this step, the fence breakpoint instruction set at step 507 is replaced with the original instruction of the debuggee program. At step 517, the status previous to interruption of the thread of the debuggee program due to the single stepping mechanism is restored based on the program running status saved at step 514. Next, at step 518, control is returned to the thread of the debuggee program to continue its running. That is, as indicated at time t6 of FIG. 5, the thread continues to execute other instructions from the instruction "INSTR.4".

A process for setting fence breakpoints at the above step 507 will be described in conjunction with FIGS. 6-9 below.

One consideration in implementing the process for setting fence breakpoints is to locate the optimal positions of the fence breakpoints. As mentioned above, in the present embodiment, the fence breakpoints are set at the position one-instruction-previous to the breakpoint for debugging. Therefore, in the process, at first, the previous instructions of the breakpoint for debugging, need to be located.

When a program is running, the CPU must determine the address of next instruction to be executed one by one, so as to ensure the normal execution of the program. The program counter (PC) is an element for this purpose, which is used to store the address of the storage location of the next instruction. Usually, a program is executed sequentially. Before beginning to execute, the address of the first instruction is put into the PC. When the first instruction is taken out and executed, the controller automatically increments the content of the PC to indicate the address of the storage location of the next instruction to be executed. When a jump instruction is executed, the jump address is assigned to the program counter to implement the jump of the program. The execution order could be changed. So, for the instruction being executed currently, its address may be continuous with that of the previous instruction, or may be not. Therefore, if there is no additional information on the program instruction stream, it is difficult to locate the previous instructions of the current instruction correctly.

In the present embodiment, control flow information of the debuggee program and instruction length information saved during the compiling process are used as additional information to locate the previous instructions of the breakpoint for debugging.

Figure 6:
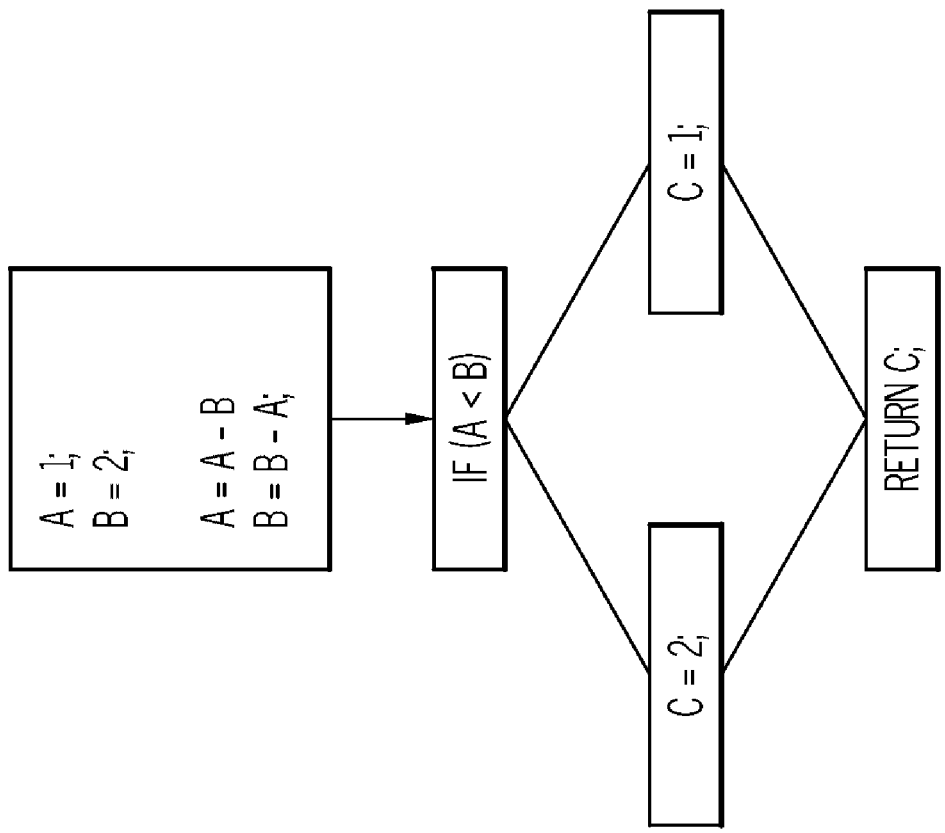
FIGS. 6(a) and 6(b) show a fragment of exemplary source codes and its corresponding control flow graph, respectively.

FIG. 6 shows a fragment of exemplary source code and its corresponding control flow graph, in which the left side in the figure is the exemplary source code and the right side is its corresponding control flow graph.

The control flow graph is a data structure built on top of intermediate language in the compiling process, for abstracting the control flow behavior of the program compiled currently. Specifically, the control flow graph is a directed graph composed of a limited number of nodes and the directed edges between the nodes, wherein the all directed edges are all paths along which the program is possibly executed during the execution process. Each node represents a basic block. A basic block is a fragment of codes executed continuously with only one entry and only one exit.

After obtaining the control flow graph of the instruction stream of the debuggee program and the instruction length information recorded in the compiling process, the setting of the fence breakpoint will be easy to implement. Specifically, it can be determined whether the address of the breakpoint for debugging is the base address, i.e. the first instruction of the basic block, of the basic block where it locates based on the information about the control flow graph. If it is the base address of the basic block, this means that the address of the previous instruction of the breakpoint for debugging may be discontinuous with it, and there may be a plurality of such previous instructions. What can be determined is that these previous instructions are the last respective instructions of the parent blocks of the basic block where the breakpoint for debugging locates. So, the fence breakpoints can be set by determining the list of these parent blocks based on the control flow graph and locating the last instruction in each parent block.

On the other hand, if the address of the breakpoint for debugging is not the base address of the basic block where it locates, it can be determined that the breakpoint for debugging and its previous instruction are in a same basic block, and their addresses are continuous. But for architectures supporting variable length instructions, it is difficult to determine the address of the previous instruction in a reversed order. Therefore, the previous instruction of the breakpoint for debugging can be located by accumulating the length of every instruction in the basic block onto the base address of the basic block until the accumulated sum is equal to the address of the breakpoint for debugging, and then subtracting the length of the current instruction (the previous instruction of the breakpoint for debugging) from the sum. Of course, if the address of the breakpoint for debugging and the length of its previous instruction can be determined directly (normally on architectures with fixed instruction length), the address of previous instruction can be determined by subtracting the length of the previous instruction from the address of the breakpoint for debugging.

Figure 7:
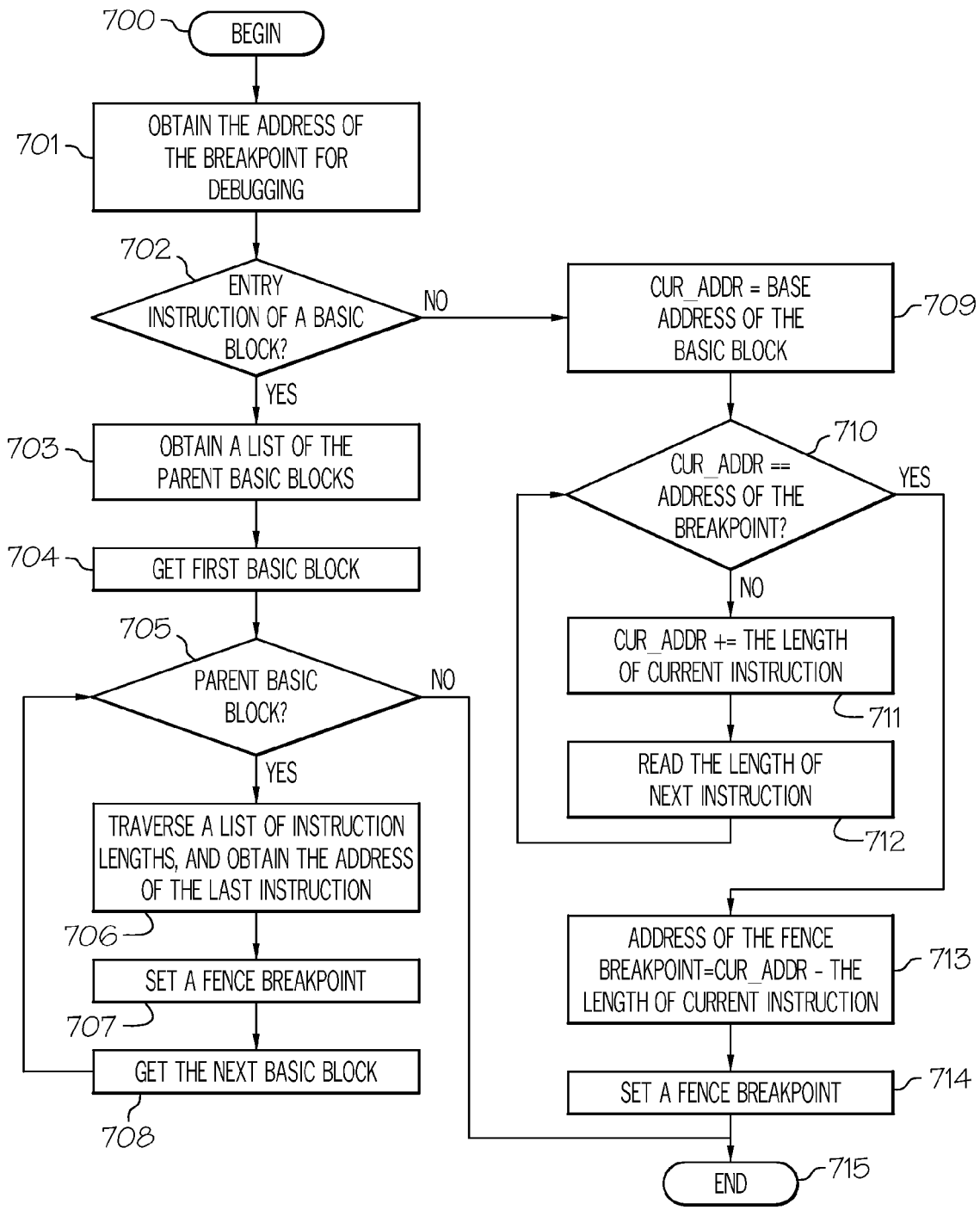
FIG. 7 is a flowchart illustrating the process for setting a fence breakpoint in the method of FIG. 5.

FIG. 7 shows a detailed flow of a process for setting a fence breakpoint according to an embodiment of the present invention. As shown in FIG. 7, first at step 701, the address of the breakpoint for debugging is obtained as an input. At the present step, the address of the breakpoint for debugging can be determined according to the current value of the program counter.

Next, at step 702, based on the control flow graph, it is determined whether the address of the breakpoint for debugging obtained at step 701 is at the entry of its basic block, that is, whether the breakpoint for debugging is set on the first instruction of this basic block. If so, then the process proceeds to step 703, otherwise proceeds to step 709. At step 703, the list of the parent basic blocks of the basic block where the breakpoint for debugging locates is obtained. At this step, the list of the parent basic blocks is also obtained based on the information of the control flow graph. That is, in the control flow graph, the previous basic blocks connected by a directed edge with the basic block where the breakpoint for debugging locates, are the parent basic blocks.

Next, at step 704, the first basic block in the list of the parent basic blocks determined at step 703 is obtained.

At step 705, it is determined whether the basic block is still the parent basic block of the basic block where the breakpoint for debugging locates, that is, whether the above list of the parent basic blocks has not been traversed over. If so, then the process proceeds to step 706, otherwise it turns to step 715.

At step 706, the address of the last instruction in the parent basic block is determined. Specifically, at the present step, first the base address of the parent basic block and its instruction length list saved during the compiling process are obtained, and the instruction length list is traversed so as to accumulate the length of every instruction onto the base address of the parent basic block until the instruction length list is traversed over, then the length of the current instruction (the last instruction of the parent basic block) is subtracted from the accumulated sum, the result of which is the address of the last instruction of the parent basic block.

Next, at step 707, a fence breakpoint is set at the address of the last instruction of the parent basic block determined at step 706, that is, the instruction at the address is replaced with a breakpoint instruction.

Then, at step 708, next basic block in the above mentioned list of the parent basic blocks is get, and the process turns to step 705 to continue the setting of the fence breakpoint in the next parent basic block. At step 709, the base address of the basic block where the breakpoint for debugging locates is assigned to variable CUR_ADDR.

At step 710, it is determined whether the value of variable CUR_ADDR is equal to the address of the above breakpoint for debugging. If so, then the process turns to step 713, otherwise to step 711. At step 711, the length of the current instruction is accumulated onto the variable CUR_ADDR. At step 712, the length of next instruction is read from the instruction length list of the basic block, and the process returns to step 710.

On the other hand, at step 713, the length of the current instruction is subtracted from the value of the variable CUR_ADDR to obtain the address of the previous instruction of the above breakpoint for debugging, i.e. the position at which the fence breakpoint is to be set. At step 714, a fence breakpoint is set at the position determined at step 713, that is, the instruction at this position is replaced with a breakpoint instruction. Then, at step 715, the flow ends.

Description will be given below with reference to specific examples.

Figure 8A:
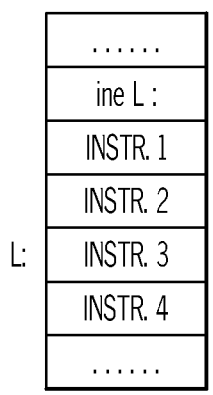
FIGS. 8(a) and 8(b) show a fragment of exemplary instruction stream and its corresponding control flow graph, respectively.
Figure 8B:
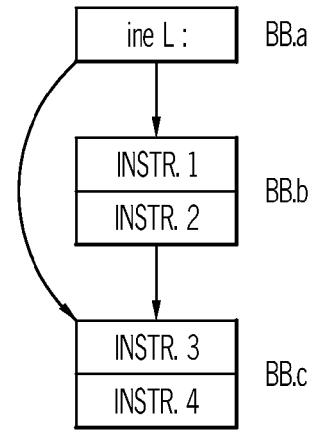
Figure 9:
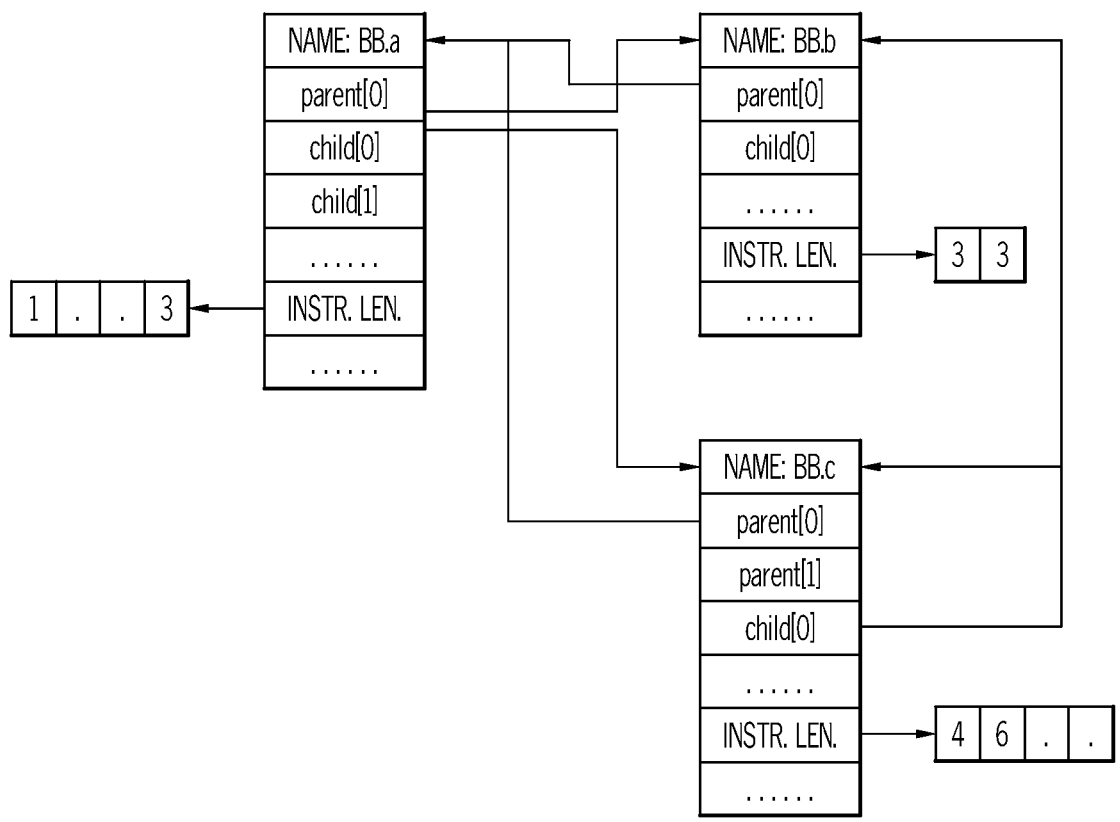
FIG. 9 is a schematic diagram illustrating the data structure of the control flow graph of FIG. 8(b)

FIG. 8 shows a fragment of exemplary instruction stream and its corresponding control flow graph, wherein the instruction stream at the left side is divided into basic blocks "BB.a", "BB.b" and "BB.c" in the corresponding control flow graph at the right side. FIG. 9 is a schematic diagram illustrating the data structure of the control flow graph of FIG. 8.

In the cases of FIGS. 8 and 9, if the user sets a breakpoint for debugging at the position of instruction "INST.4", then since the instruction "INST.4" is not at the entry of the basic block "BB.c", the instruction length list of the basic block "BB.c" as shown in FIG. 9 is traversed, and the length of each instruction is accumulated onto the base address of the basic block "BB.c" until the accumulated sum is equal to the address of the instruction "INST.4" (i.e. the address of the breakpoint for debugging). Then the length of the current instruction (the length of instruction "INST.3") is subtracted from the accumulated sum, the result of which is the address of the previous instruction ("INST.3"). Thus a fence breakpoint can be set at the position of the instruction "INST.3".

In addition, if the user sets the breakpoint for debugging at the position of the instruction "INST.3", since the instruction "INST.3" is the entry of the basic block "BB.c", fence breakpoints should be set at the respective last instructions of the parent basic blocks "BB.a" and "BB.b" of the basic block "BB.c", that is, fence breakpoints are set at the positions of instruction "INST.2" and "jne L:".

The above described is the case of setting a fence breakpoint at the previous instruction of the breakpoint for debugging. However it is not limited to this, as long as the object of fencing the breakpoint for debugging can be achieved, the fence breakpoint can be set at any position in the debuggee program.

The above is the detailed description of the method for debugging a program in multithread environment of the present embodiment. In a multithreaded environment, when a certain thread of the debuggee program runs to the breakpoint for debugging and is debugged, other threads may miss the breakpoint for debugging. The present embodiment, which inserts a fence breakpoint in front of the breakpoint for debugging of the debuggee program, ensures the other threads will not miss it. The present embodiment can implement the program debugging in multithread environment in a relatively low overhead without suspending other threads.

Figure 10:
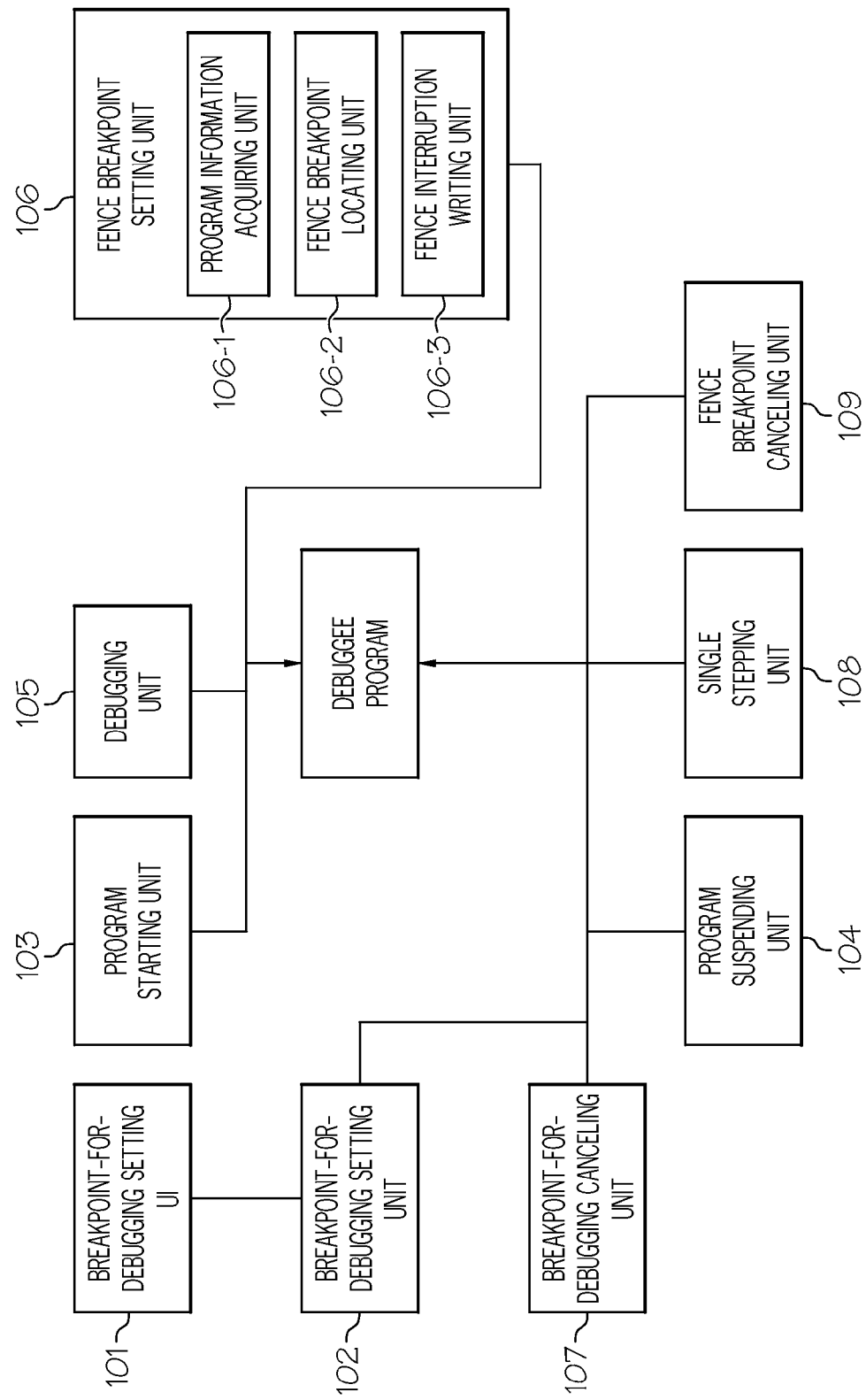
FIG. 10 is a block diagram illustrating a system for debugging a program in multithread environment according to an embodiment of the present invention.

Under the same inventive concept, FIG. 10 shows a block diagram of a system for debugging a program in multithread environment according to an embodiment of the present invention. As shown in FIG. 10, the system 10 for debugging a program in multithread environment of the present embodiment comprises a breakpoint-for-debugging setting UI 101, a breakpoint-for-debugging setting unit 102, a program starting unit 103, a program suspending unit 104, a debugging unit 105, a fence breakpoint setting unit 106, a breakpoint-for-debugging canceling unit 107, a single stepping unit 108 and a fence breakpoint canceling unit 109. The breakpoint-for-debugging setting UI 101 is used to allow the user to set a breakpoint for debugging for the debuggee program.

The breakpoint-for-debugging setting unit 102 is used to replace the instruction of the debuggee program at the position where the user sets the breakpoint for debugging with a breakpoint instruction. That is, the breakpoint for debugging is set dynamically in the program debugging process, but not pre-programmed in the program compiling process.

The program starting unit 103 is used to start the debuggee program or make the suspended debuggee program continue to run according to an instruction from a user.

The program suspending unit 104 is used to suspend the running debuggee program to enter into the breakpoint handling stage and save its current running status when a thread of the debuggee program hits to a breakpoint for debugging.

The debugging unit 105 is used to perform debugging operations on the debuggee program based on the current running status of the debuggee program when it is suspended. The fence breakpoint setting unit 106 is used to set a fence breakpoint for the debuggee program after the debugging unit 105 finishes the debugging operations and before the breakpoint instruction at the position of the breakpoint for debugging is replaced with the original instruction. Specifically, the instructions before the position of the breakpoint for debugging are set as fence breakpoints. The specific structure of the fence breakpoint setting unit 106 will be described in detail later.

The breakpoint-for-debugging canceling unit 107 is used to cancel the breakpoint for debugging of the debuggee program after the fence breakpoint setting unit 106 sets the fence breakpoints. That is, the breakpoint instruction at the position of the breakpoint for debugging is replaced with the original instruction of in the debuggee program.

The single stepping unit 108 is used to single step the original instruction restored by the breakpoint-for-debugging canceling unit 107, and make the debuggee program trapped in the breakpoint handling stage again after the single stepping. In this breakpoint handling stage, the breakpoint-for-debugging setting unit 102 replaces the original instruction again with the breakpoint instruction, thereby setting a breakpoint for debugging again at this position.

The fence breakpoint canceling unit 109 is used to cancel the fence breakpoint, that is, replace the breakpoint instructions at the fence breakpoints with the original instructions of the debuggee program, after the breakpoint-for-debugging setting unit 102 sets the breakpoint for debugging again.

In addition, as shown in FIG. 10, the fence breakpoint setting unit 106 may further comprise a program information acquiring unit 1061, a fence breakpoint locating unit 1062 and a fence interruption writing unit 1063. The program information acquiring unit 1061 is used to acquire the control flow information of the debuggee program and the instruction length information saved during the compiling process. The fence breakpoint locating unit 1062 is used to locate the positions of the fence breakpoints. Specifically, it determines whether the address of the breakpoint for debugging of the debuggee program is the entry address of a basic block based on the control flow information acquired by the program information acquiring unit 1061. In the case that the breakpoint for debugging is the entry of the basic block, the fence breakpoint locating unit 1062 determines a list of parent basic blocks of the basic block where the breakpoint for debugging locates based on the control flow information, and locates the position of last instruction of each parent basic block in turn based on the entry address of the parent basic block and the length information of each instruction therein. The method for locating the positions of the fence breakpoint in this case has been described in detail in conjunction with FIG. 7, thus the specific detail is omitted here.

On the other hand, in the case that the address of the breakpoint for debugging is not the entry address of the basic block, the fence breakpoint locating unit 1062 acquires the address of the breakpoint for debugging and the length of its previous instruction, and subtracts the length of the previous instruction from the address of the breakpoint for debugging. In addition, in the case that the length of the previous instruction of the breakpoint for debugging cannot be determine directly, the fence breakpoint locating unit 1062 adds the length of each instruction of the basic block onto the entry address of the basic block in turn based on the instruction length information of the basic block until the accumulated sum is equal to the address of the breakpoint for debugging, thus locating the address computed by subtracting the length of the current instruction (the instruction previous to the breakpoint for debugging) from the accumulated sum. The method for locating the position of the fence breakpoint in this case has been described in detail in conjunction with FIG. 7, thus the specific detail is omitted here.

The fence interruption writing unit 1063 is used to replace the respective instructions at the positions at which the fence breakpoint locating unit 1062 locates with fence breakpoints instruction, i.e. a trap instruction.

Those skilled in the art should understand that the present invention may be implemented by hardware circuit such as programmable hardware devices, or may be implemented in the form of various types of processors executing corresponding software, or may be implemented by a combination of the above hardware circuit and corresponding software. Moreover, these various components may be physically implemented together, or may be physically independent but operationally interoperable with each other.

What is claimed is:

1. A method for debugging a program in a multithread environment, comprising:
    replacing an instruction at a first position at which a breakpoint for debugging is desired with a breakpoint instruction that interrupts the running of a debuggee program;
    before debugging, setting an instruction in front of the breakpoint instruction for debugging as a fence breakpoint and locating the position of the instruction set as a fence breakpoint;
    debugging at least one instruction of the debuggee program; and
    replacing the fence breakpoint with an original instruction of the debuggee program at the position of the fence breakpoint, the original instruction not being executed during debugging until after being written back to the position of the fence breakpoint,
    wherein, when a thread of the debugee program runs to the breakpoint instruction for debugging, suspending the thread and debugging the debugee program according to its current running status.

2. The method for debugging a program in a multithread environment according to claim 1, comprising the steps of:
    before said debuggee program runs, setting said breakpoint for debugging in the debuggee program;
    replacing the instruction of the debuggee program at the position of the breakpoint for debugging with a breakpoint instruction; and starting the debuggee program.

3. The method for debugging a program in a multithread environment according to claim 1, after the step of setting a fence breakpoint, further comprising:
    canceling the breakpoint for debugging of the debuggee program to replace the instruction at the breakpoint for debugging with the original instruction of the debuggee program at that position;
    single stepping the original instruction replaced; and
    after the original instruction is single stepped, setting again a breakpoint for debugging at the position of the original instruction to replace the original instruction with a breakpoint instruction.

4. The method for debugging a program in a multithread environment according to claim 3, wherein after setting again a breakpoint for debugging, the fence breakpoint of the debuggee program is cancelled to replace the instruction at the fence breakpoint back with the original instruction at that position.

5. The method for debugging a program in a multithread environment according to claim 4, after canceling the fence breakpoint, further comprising making the debuggee program continue to run.

6. The method for debugging a program in a multithread environment according to claim 1, wherein the replaced instruction at the first position is a fence breakpoint instruction.

7. The method for debugging a program in a multithread environment according to claim 6, wherein the step of setting an instruction in front of the breakpoint for debugging as a fence breakpoint further comprises setting the fence breakpoints at the positions of previous instructions of the breakpoint for debugging.

8. The method for debugging a program in a multithread environment according to claim 7, wherein the step of locating the setting positions of the fence breakpoints further comprises locating positions of previous instructions of the breakpoint for debugging based on control flow information and length information of each instruction of the debuggee program.

9. The method for debugging a program in a multithread environment according to claim 8, wherein the control flow information and the length information of each instruction are saved during the compiling process of the debuggee program.

10. The method for debugging a program in a multithread environment according to claim 8, wherein the control flow information is a data structure of a control flow chart of the debuggee program, which includes basic blocks of codes executing continuously and the control flow directions between the basic blocks.

11. The method for debugging a program in a multithread environment according to claim 10, wherein the step of locating the position of the previous instruction of the breakpoint for debugging further comprises:
    based on the control flow chart, determining whether the address of the breakpoint for debugging is the entry address of a basic block;
    in a case wherein the address of the breakpoint for debugging is the entry address of a basic block, finding all parent basic blocks of the basic block based on the control flow chart;
    obtaining the address of last instruction of each parent basic block based on the entry address and the length information of the instructions of the parent basic block; and
    locating the obtained address of last instruction of each parent basic block; and
    in a case wherein the address of the breakpoint for debugging is not the entry address of a basic blocks, obtaining the address of the breakpoint for debugging and the length of the previous instruction; subtracting the length of the previous instruction from the address of the breakpoint for debugging; and locating the address obtained by subtracting the length of the previous instruction from the address of the breakpoint for debugging.

12. The method for debugging a program in a multithread environment according to claim 2, wherein the breakpoint instruction is a trap instruction.

13. The method for debugging a program in a multithread environment according to claim 6, wherein the fence breakpoint instruction is a trap instruction.

14. A system for debugging a program in a multithread environment, which interrupts the running of a debuggee program by replacing an instruction at a position at which a breakpoint for debugging is desired to be set with a breakpoint instruction, comprising:
    a fence breakpoint setting device for, when the breakpoint instruction is replaced with the original instruction at the position at which the breakpoint for debugging is set, setting an instruction in front of the breakpoint for debugging as a fence breakpoint, locating the position of the instruction set as a fence breakpoint and, when a thread of the debugee program runs to the breakpoint instruction for debugging, suspending the thread; and
    a fence breakpoint canceling device for, when the instruction at the position at which the breakpoint for debugging is set is replaced again with the breakpoint instruction and, when after debugging the debugee program according to its current running status, replacing the fence breakpoint with the original instruction of the debuggee program at that position, the original instruction not being executed during debugging until after being written back to the position of the fence breakpoint.

15. The system for debugging a program in a multithread environment according to claim 14, further comprising:
   a breakpoint-for-debugging setting UI, for allowing the user to set a breakpoint for debugging in the debuggee program; and
   a breakpoint-for-debugging setting device, for replacing the instruction of the debuggee program at the position where the user sets the breakpoint for debugging with a breakpoint instruction.

16. The system for debugging a program in a multithread environment according to claim 15, further comprising a program starting device for starting the debuggee program or making a suspended debuggee program continue to run.

17. The system for debugging a program in a multithread environment according to claim 16, further comprising:
   a program suspending program for, when a thread of the debuggee program runs to the breakpoint for debugging, suspending the running debuggee program and saving its current running status; and
   a debugging device for, when the debuggee program is suspended, performing debugging operations on the debuggee program based on the current running status.

18. The system for debugging a program in a multithread environment according to claim 17, wherein the fence breakpoint setting unit sets a fence breakpoint for the debuggee program after the debugging device performs the debugging operations.

* * * * *